United States Patent
O'Sullivan et al.

(10) Patent No.: US 8,500,305 B2
(45) Date of Patent: Aug. 6, 2013

(54) ACTIVE THERMAL MANAGEMENT SYSTEMS FOR ENCLOSED LIGHTING AND MODULAR LIGHTING SYSTEMS INCORPORATING THE SAME

(75) Inventors: Timothy J. O'Sullivan, Raleigh, NC (US); Nicholas W. Medendorp, Jr., Raleigh, NC (US); Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 735 days.

(21) Appl. No.: 12/245,458

(22) Filed: Oct. 3, 2008

(65) Prior Publication Data

US 2010/0085759 A1 Apr. 8, 2010

(51) Int. Cl.
  *F21V 29/00* (2006.01)
  *F21V 33/00* (2006.01)
(52) U.S. Cl.
  USPC ............................. 362/294; 362/96; 362/253
(58) Field of Classification Search
  USPC .................................................. 362/96, 253
  See application file for complete search history.

(56) References Cited

U.S. PATENT DOCUMENTS

| | | | | |
|---|---|---|---|---|
| 4,630,182 A | * | 12/1986 | Moroi et al. | 362/294 |
| 5,458,505 A | * | 10/1995 | Prager | 439/485 |
| 5,664,872 A | * | 9/1997 | Spearman et al. | 362/96 |
| 6,527,418 B1 | * | 3/2003 | Scherba | 362/294 |
| 7,144,135 B2 | * | 12/2006 | Martin et al. | 362/294 |
| 7,204,615 B2 | * | 4/2007 | Arik et al. | 362/294 |
| 7,258,464 B2 | * | 8/2007 | Morris et al. | 362/264 |
| 7,438,440 B2 | * | 10/2008 | Dorogi | 362/294 |
| 7,524,089 B2 | * | 4/2009 | Park | 362/294 |
| 7,641,364 B2 | * | 1/2010 | Abbondanzio et al. | 362/295 |
| 7,677,770 B2 | * | 3/2010 | Mazzochette | 362/364 |

OTHER PUBLICATIONS www.nuventix.com/news/Nuventix-Announces-SynJet-Fanless-Air Cooler-for-Philips-Fortimo-LED-Downlight-Module, Apr. 7, 2008.
"New Lamp From LED Lighting Fixtures Shatters World Record for Energy Efficiency," LED Lighting Fixtures press release, Cree, Inc., Morrisville, North Carolina, Nov. 28, 2007.
U.S. Appl. No. 60/990,439, filed Nov. 27, 2007, Negley et al.

* cited by examiner

*Primary Examiner* — David J Makiya
(74) *Attorney, Agent, or Firm* — Myers Bigel Sibley & Sajovec, P.A.

(57) ABSTRACT

A thermal management apparatus includes a lighting assembly and a cooling module that is removably coupled to the lighting assembly. A recessed downlight fixture includes a housing having an open end, an electrical power access port, a cooling module in the housing that is removably coupled to the electrical power access port, and a light source in the housing that is removably coupled to the electrical power access port. The light source is operable to project light through the open end of the housing. A cooling device is provided that includes a male Edison or GU24 port interface and a female Edison or GU 24 port interface.

35 Claims, 7 Drawing Sheets

ACTIVE THERMAL MANAGEMENT SYSTEMS FOR ENCLOSED LIGHTING AND MODULAR LIGHTING SYSTEMS INCORPORATING THE SAME

BACKGROUND

The present invention relates to recessed lighting and, more particularly, to thermal management for recessed lighting.

Recessed downlights are a large category of lighting in the United States. Recessed downlights provide a fixture that is mounted in the ceiling such that the light source is recessed above the plane of the ceiling. A wide variety of these recessed downlight fixtures are used in both residential and commercial applications. The fixtures typically utilize an incandescent Parabolic Aluminized Reflector (PAR) lamp as the light source, although recessed downlight fixtures specifically designed for compact fluorescents are also utilized.

Recently solid state lighting systems have been developed for general illumination applications. The design of a solid state lighting system for general illumination typically involves designing optical, power and thermal management systems in order to provide a particular level of performance with respect to lumen output, power requirements and junction temperature of Light Emitting Diode (LED) light sources. The junction temperature of LEDs may be important as it may be a contributing factor in the lifetime of the LEDs. In particular, if the junction temperature exceeds the recommended junction temperature of the manufacturer, then the LEDs will typically not achieve the lifetime rated by the manufacturer. Furthermore, as the operating temperature of LEDs changes, the current through the LEDs may change. For this and other reasons, changes in operating temperature can result in color shifts in the resulting light output. Maintaining a stable operating temperature may, therefore, also benefit in maintaining stable color output of a solid state light source.

Thermal management for solid state lighting systems has generally fallen into two categories: passive systems and active systems. These systems have typically been integral to the lighting device. Thus, for example, the LR6 recessed downlight from Cree LED Lighting Solutions of Morrisville, N.C., utilizes a passive system that incorporates a heat sink that is exposed to the room in which the LR6 is mounted. Thus, the LR6 provides not only the light source but also the trim for a recessed fixture in which the LR6 is mounted. By exposing the heat sink to the room the LR6 benefits from any air currents that break the boundary layer between the heat sink and the air in the room. Breaking the boundary layer between a heat sink and its environment can increase the efficacy of the heat sink, thereby lowering the junction temperature of the LEDs.

Active thermal management for solid state lighting systems has also been utilized. For example, U.S. Pat. No. 7,144,135 entitled "LED Lamp Heat Sink" describes an LED lamp that includes a fan that moves air over a heat sink. Additionally, LED downlights with integral synthetic jet cooling systems have also been announced by Nuventix and Philips. See nuventix.com/news/Nuventix-Announces-SynJet-Fanless-Air-Cooler-for-Philips-Fortimo-LED-Downlight-Module date Apr. 7, 2008 on the World Wide Web.

SUMMARY

According to some embodiments of the present inventive subject matter, a thermal management apparatus includes a cooling module that is removably coupled to a lighting assembly.

In other embodiments, the lighting assembly includes an electrical power access port and a light source that is coupled to the access port.

In still other embodiments, the cooling module is disposed between the electrical power access port and the light source.

In still other embodiments, the cooling module is a fan having an axis of rotation that is substantially coaxial with an axis defined by the electrical power access port and an electrical power connector of the light source.

In still other embodiments, the cooling module is a fan having an axis of rotation that is substantially perpendicular to an axis defined by the electrical power access port and an electrical power connector of the light source.

In still other embodiments, the electrical power access port may be an Edison or GU24 port that is configured to receive the cooling module. The cooling module includes an Edison or GU24 port that is configured to receive the light source.

In still other embodiments, the apparatus further includes control circuitry that is configured to operate the cooling module responsive to an operation of the light source that affects ambient temperature. In still other embodiments, the control circuitry is further configured to operate the cooling module responsive to power consumption of the light source and/or intensity of light provided by the light source.

In still other embodiments, the control circuitry is configured to enable operation of the cooling module when the ambient temperature exceeds a threshold temperature. In particular embodiments, the threshold temperature is a first threshold temperature and the control circuitry is configured to disable operation of the cooling module when the ambient temperature falls below a second threshold temperature that is lower than the first threshold temperature so as to provide a hysteresis effect.

In still other embodiments, the control circuitry is configured to periodically enable operation of the cooling module when the ambient temperature exceeds a threshold temperature.

In still other embodiments, the cooling module includes the control circuitry.

In still other embodiments, the apparatus further includes control circuitry that is configured to operate the light source responsive to an operation of the cooling module that affects ambient temperature.

In still other embodiments, the control circuitry is configured to operate the light source responsive to power consumption of the cooling module, air movement proximate to the lighting assembly, and/or movement of a part associated with the cooling module.

In still other embodiments, the light source is a solid state light source.

In still other embodiments, the solid state light source includes a Light Emitting Diode (LED), an Organic LED (OLED), and/or a Polymer LED (PLED).

In still other embodiments, the light source includes a fluorescent lamp. In particular embodiments, the fluorescent lamp is a compact fluorescent lamp.

In still other embodiments, the light source includes an incandescent lamp.

In still other embodiments, the cooling module is one or more air movement devices.

In still other embodiments, the air movement device includes a fan. In particular embodiments, the fan is an axial flow fan, a mixed flow fan, a cross flow fan, or a centrifugal fan.

In still other embodiments, the air movement device includes a synthetic jet.

In still other embodiments, the apparatus further includes a housing having an open end. The lighting assembly and cooling module are positioned in the housing so as to be recessed from the open end and the lighting assembly is operable to project light through the open end of the housing.

In still other embodiments, the housing includes a recessed downlight fixture.

In further embodiments of the present invention, a recessed downlight fixture includes a housing having an open end, an electrical power access port, a cooling module in the housing that is removably coupled to the electrical power access port, and a light source in the housing that is removably coupled to the electrical power access port. The light source is operable to project light through the open end of the housing.

In still further embodiments, the fixture further includes an air direction component contained in the housing that is configured to direct a flow of air through the housing in proximity to the cooling module.

In still further embodiments, the housing includes the air direction component.

In other embodiments of the present invention, a cooling device includes a male Edison or GU24 port interface and a female Edison or GU 24 port interface.

In still other embodiments, the cooling device includes an air movement device.

In still other embodiments, the air movement device includes a fan.

In still other embodiments, the fan is an axial flow fan, a mixed flow fan, a cross flow fan, or a centrifugal fan.

In still other embodiments, the air movement device includes a synthetic jet.

Additional embodiments provide an apparatus that includes a thermal management device. The thermal management device includes a first electrical connector configured to connect to an electrical connector of a light fixture and a second electrical connector configured to connect to a light source. The thermal management device is further configured to electrically couple the electrical connector of the light fixture to the light source so as to provide electrical power from the electrical connector of the light fixture to the light source.

The thermal management device may also include an air movement device configured to move air proximate the light source so as to break a boundary layer between the light source and the surrounding environment. The air movement device may be a fan. The fan may be an axial flow fan, a mixed flow fan, a cross flow fan, or a centrifugal fan. The air movement device could also be a synthetic jet.

In some embodiments, the first electrical connector includes an Edison or GU24 interface and the second electrical connector includes an Edison or GU24 interface.

In further embodiments, the apparatus also include control circuitry configured to selectively provide power to the light source. In some embodiments, the control circuitry prevents power from being provided to the light source if the air movement device has failed. Control circuitry may also selectively operate the air movement device responsive to a temperature associated with the light source or the environment of the thermal management device. The control circuitry may be configured to operate the air movement device if the temperature exceeds a first threshold temperature and prevent operation of the air movement device if the temperature is below a second threshold temperature. The first threshold temperature is higher than the second threshold temperature.

In some embodiments, the overall dimensions of the apparatus are not greater than the opening in an 8" recessed downlight, in some embodiments a 6" recessed downlight and in other embodiments a 4" recessed downlight. In particular embodiments, the overall dimensions of the apparatus are not greater than the diameter of a BR40 lamp, in some embodiments a PAR38 lamp, in some embodiments a PAR30 lamp and in other embodiments an MR16 lamp. The overall dimensions of these various lamps are defined in ANSI Standard C78-21.

DETAILED DESCRIPTION

Figure 1A:
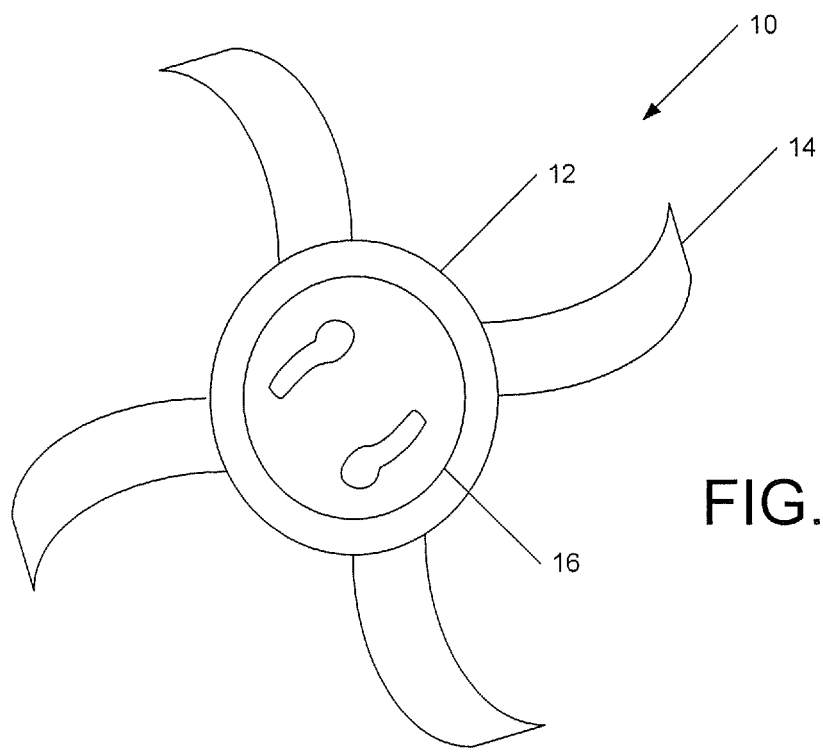
FIGS. 1A through 1C are top, bottom and side views of an accessory fan according to some embodiments of the present invention.

Embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

One issue with providing a PAR lamp or a lamp replacement using solid state lighting is the wide range of environments in which these lamps may be utilized. For example, a PAR lamp may be used in an open track where the lamp is directly exposed to the environment of the room or it may be used in a recessed downlight where the light is recessed into a cavity in the ceiling. These two environments typically provide very different thermal problems for the replacement lamp. In the open track application, the heat sink of the replacement lamp may be in an ambient temperature of 25° C. with the expectation that the boundary layer between the heat sink and the ambient environment will be, at least periodically, disrupted. In contrast, in the recessed application, the heat sink of the replacement lamp may be in an ambient environment of 45° C. with no expectation that the boundary layer will be disrupted. This 20° C. temperature differential and lack of disruption of the boundary layer can impose substantially different requirements on a thermal management system for the two applications.

One conventional approach has been to design a thermal management system for the worst case scenario (e.g., the recessed downlight application). However, as the difference in the thermal requirements for different environments in which a replacement lamp may be used becomes more diverse, designing to the worst case scenario may increase the cost and/or complexity of replacement lamps for all applications.

Some embodiments of the present invention may provide a modular system approach where adding an accessory component provides a different thermal management system for the replacement lamp. In particular, the replacement lamp is provided with a first thermal management system which, in some embodiments, is a passive thermal management system (e.g., a heat sink and/or heat pipe), for open environment applications and a second, active thermal management system (e.g., a cooling module, such as a cooling fan or synthetic jet) for enclosed environments, such as a recessed downlight application.

The modular approach according to some embodiments of the present invention may reduce cost, improve performance, and/or improve utilization of solid state lighting replacement lamps. For example, in an open environment the lamp replacement may not need the active cooling system. Therefore, the power required to run the active cooling system need not be expended. Likewise, the cost of adding the active cooling system to the replacement lamp may be avoided.

In particular embodiments of the present invention, an accessory cooling system or module is provided that is interposed mechanically and electrically between a conventional socket (i.e., electrical power access port) and the replacement lamp. The accessory cooling system or module may have a conventional "Edison" or pin-type male connector such as a GU24 connector that connects to the corresponding conventional female electrical socket. The accessory cooling system or module may also have a conventional "Edison" or pin-type female connector such as a GU24 connector that connects to the corresponding male connector of the replacement lamp. The accessory cooling system or module may also have an active cooling component that provides additional heat transfer from the replacement lamp. In certain embodiments, the accessory cooling system or module is configured to be disposed at the "top" of a recessed fixture behind the replacement lamp and to circulate air into and out of the recessed fixture to lower the temperature of the environment in the recessed fixture. In further embodiments, the accessory cooling system or module may have a diameter that is not greater than the maximum diameter of a BR40 lamp, a PAR30 lamp, a PAR38 lamp, and/or an MR16 lamp. The dimensions of these various lamps are defined in ANSI Standard C78-21. The overall dimensions of the accessory cooling system or module may not be greater than the opening in an 8" recessed downlight, a 6" recessed downlight, and/or a 4" recessed downlight in accordance with various embodiments of the present invention.

As used herein, the term "cooling" refers to increasing the heat transfer of the light source, irrespective of whether the ambient environment in which the light source is placed actually decreases in temperature. In fact, in some cases, a "cooling" device may actually cause the ambient temperature to increase as heat is more effectively transferred from the light source to the ambient environment. For example, a device which breaks the boundary layer between the light source and the ambient may increase the extraction of heat from the light source without decreasing the ambient temperature. Thus, a "cooling" device is any device which improves the heat transfer from the light source, whether by decreasing the thermal resistance to the ambient environment, increasing the temperature differential between the light source and the ambient environment, combinations of the two or through other mechanisms. Accordingly, a cooling device, system, or module may also be referred to herein as a thermal management device or module.

In some embodiments, the cooling system or module may include a fan disposed coaxially with male and female electrical connectors. Alternatively and/or additionally, a 90 degree elbow may be provided in the electrical connector for the cooling system or module to provide for horizontal recessed Compact Fluorescent Light (CFL) fixtures. In further embodiments, multiple fans may be provided or one or more fans may be provided that are not coaxial with the electrical connectors. The fan(s) may, for example, be axial-flow, centrifugal mixed flow or cross-flow in accordance with various embodiments of the present invention.

Figure 1B:
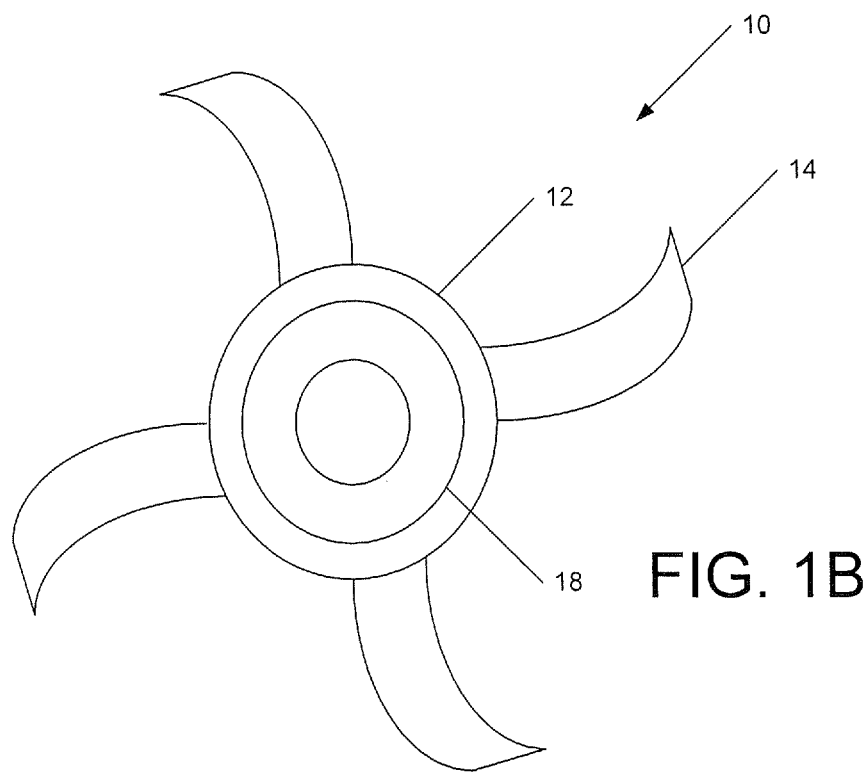
Figure 1C:
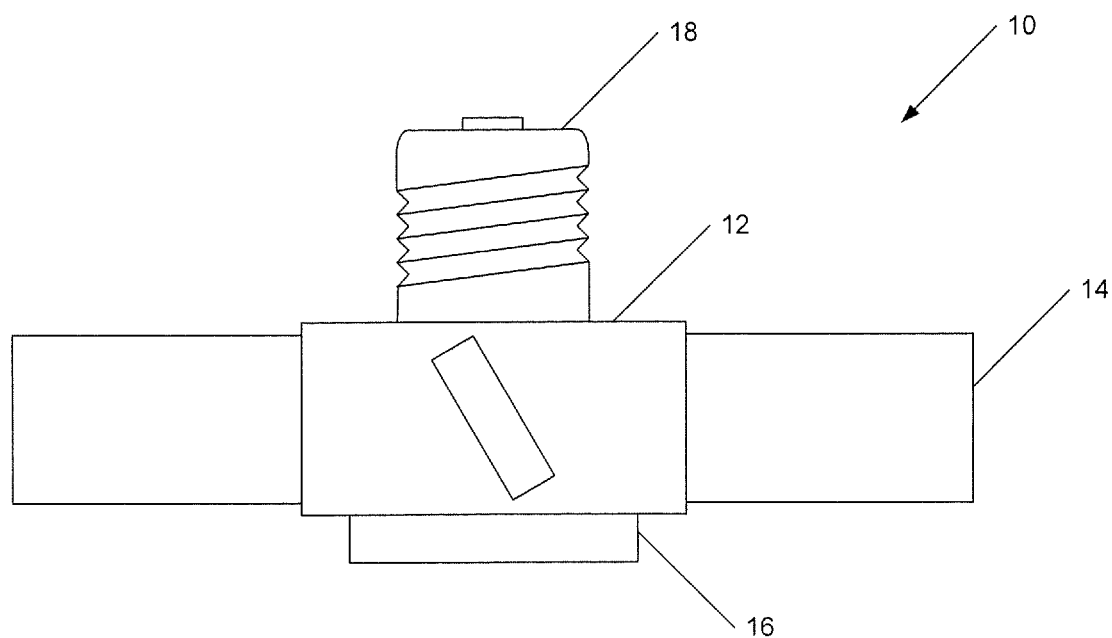
Figure 2:
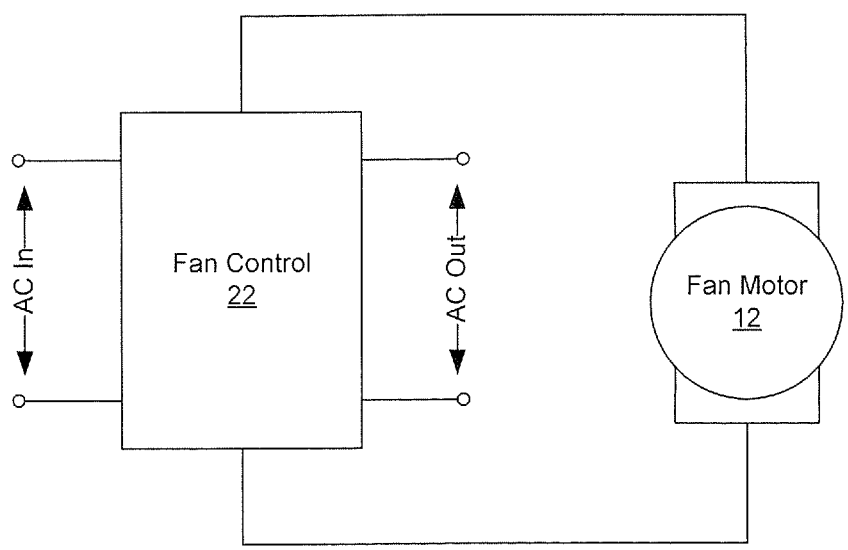
FIG. 2 is a block diagram of an accessory fan according to some embodiments of the present invention.
Figure 3:
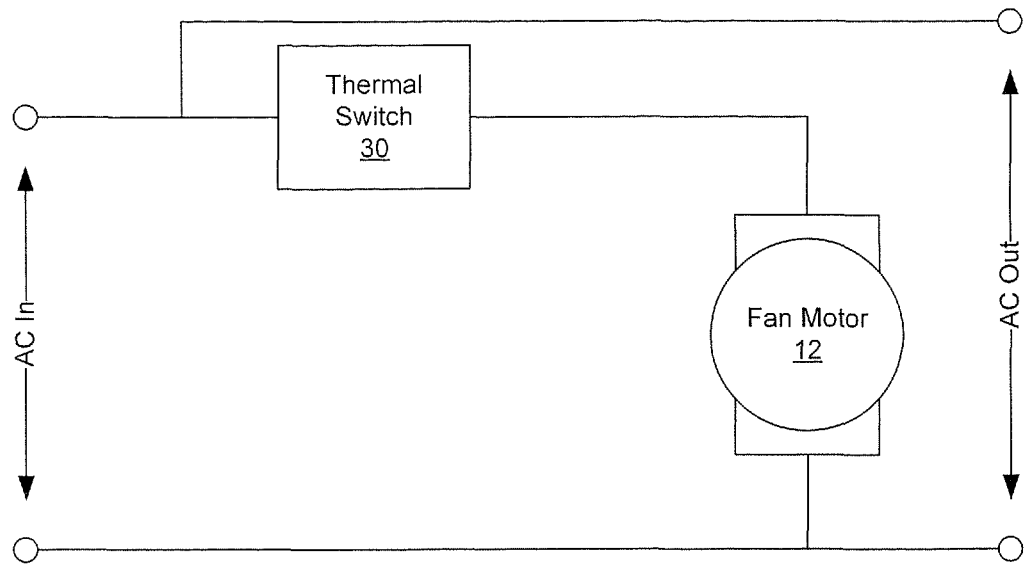
FIG. 3 is a block diagram of an accessory fan incorporating thermal switching according to some embodiments of the present invention.
Figure 4:
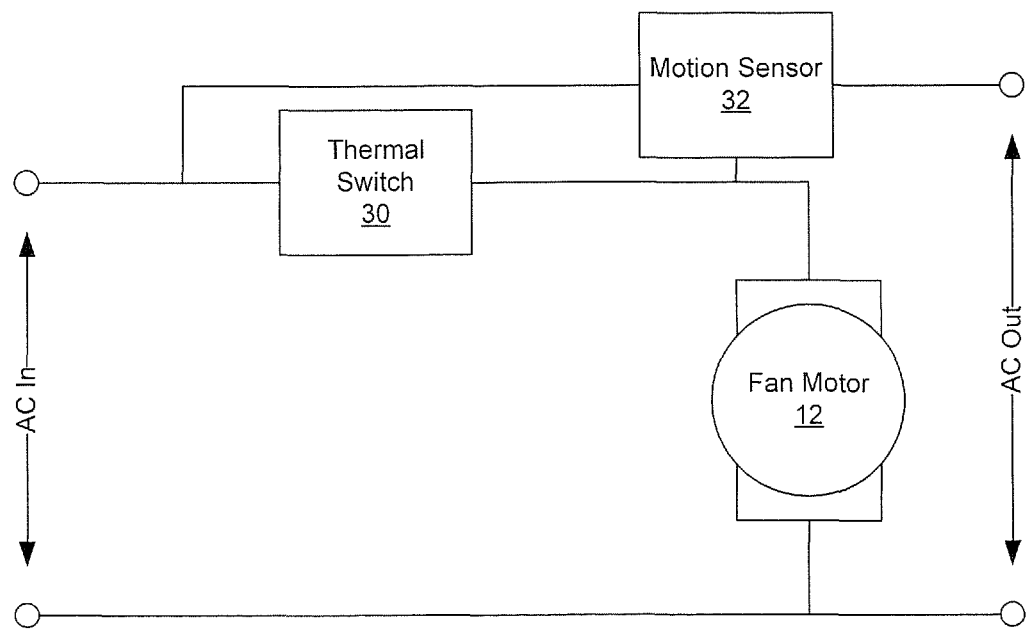
FIG. 4 is a block diagram of an accessory fan incorporating thermal switching and motion detection according to some embodiments of the present invention.

FIGS. 1A through 1C are bottom, top and side views of an active cooling system or module 10 that includes a fan motor 12, fan blades 14, a female connector 16 and a male connector 18 according to some embodiments of the present invention. The fan motor 12 may be an AC or DC motor. Any suitable motor assembly may be utilized. An appropriate motor control circuit may be provided depending on the design of the motor. In a particular embodiment, the motor is a coaxial motor with an open center such that any control or other circuitry, for example, as illustrated in FIGS. 2 through 4, may be housed at least partially within the center portion of the motor 12.

Fan blades 14 are provided to generate air movement. The particular configuration of the fan blades and their speed of rotation may be established to provide relatively silent air movement. As discussed above, only a small amount of air movement may be needed to improve the cooling of a replacement lamp. In some embodiments, the amount of air movement may be just sufficient to break the boundary layer between the air in the recessed fixture and a heat sink of a replacement lamp. In other embodiments, the air movement is sufficient to provide an air interchange with a room or other environment in which the recessed fixture is mounted.

While the embodiments illustrated in FIGS. 1A through 1C are shown as having a propeller axial-flow configuration, other types of fans, such as centrifugal (squirrel cage), mixed flow, or cross-flow could also be utilized. Certain embodiments of the present inventive subject matter are, therefore, not limited to a particular fan configuration, or even to a fan as the active cooling mechanism. For example, a synthetic jet such as those provided by Nuventix could be used to generate air flow. Other air movement devices, such as piezoelectric diaphragms could also be utilized.

Returning to FIGS. 1A through 1C, a first connector 18 is provided as part of the assembly 10 to provide mechanical and/or electrical connection to an existing recessed lighting fixture lamp connector or holder. UL 1598 provides a more detailed discussion of lamp sockets. The first connector may, for example, be a screw base (Edison connection), such as an E46 base, a pin base, such as a GU-24 base, or other electrical connector.

A second connector 16 is provided as part of the assembly 10 to provide mechanical and/or electrical connection to a replacement lamp connector or holder. UL 1993 provides a more detailed discussion of lamp holders. The second connector may, for example, be a screw base (Edison connection), such as an E46 base, a pin base, such as a GU-24 base, or other electrical connector.

FIG. 2 illustrates the electrical connection of a fan motor 12 or other suitable device for generating air motion and fan control circuitry 22 to control operation of the fan motor 12 or other such device according to some embodiments of the present invention. In some embodiments, the fan control circuitry 22 connects the fan motor 12 to the AC input and connects the replacement lamp to the AC output. In such a case, the fan may run continuously as long as power is present on the AC input. While such a system may provide the desired thermal management of a solid state lighting device utilized as a replacement lamp, it may not be the most energy efficient solution.

FIG. 3 illustrates further embodiments of the control circuitry 22 in which a thermal switch 30 is placed between the fan motor 12 and the AC input. In the embodiments illustrated in FIG. 3, the fan only operates when the temperature in the recessed fixture reaches or exceeds a predefined threshold value, such as, for example, 30° C., 35° C. or 40° C. In some embodiments, hysteresis is built into the thermal switch 30 so that the fan begins operating at a first threshold temperature and ceases operating at a second threshold temperature where the second threshold is a temperature lower than the first threshold temperature. Alternatively, the thermal switch 30 may operate for a fixed minimum time period once the first threshold temperature is reached and continue operation as long as the temperature in the recessed fixture remains above the first threshold temperature. That is, the thermal switch may periodically enable operation of the fan motor 12 while the temperature in the recessed fixture remains above the first threshold temperature.

By only operating the fans when the temperature in the vicinity of the replacement lamp reaches a threshold temperature, the energy consumed by the fan may be reduced over that of continuous operation. Furthermore, only selectively operating the fan may extend the life of the fan. Moreover, embodiments of the present inventive subject matter have been described with respect to the control circuitry using the actual ambient temperature to selectively control operation of the cooling system or module, e.g., the fan. In accordance with various embodiments of the present invention, any operation of the light source that affects ambient temperature may be used as a basis for controlling operation of the cooling system or module. For example, in some embodiments of the present invention, power consumption of the light source, the current and/or voltage characteristics of the light source, and/or the intensity of light provided by the light source may be used as a basis for controlling operation of the cooling system or module. The control circuitry 22 used for controlling operation of the cooling system or module may be included as an integral part of the cooling system or module or may be wholly or partially separate from the cooling system or module in accordance with various embodiments of the present invention.

A further difficulty with integral active cooling of replacement solid state lighting lamps may be that the lifetime of the cooling system may be less than that of the LEDs (e.g., 50,000 hours). Thus, a fan in a solid state lamp may fail before the LEDs fail. In the event of a failure of the fan, the temperature of the replacement lamp may increase, thereby shortening the lifetime of the lamp and/or resulting in undesirable color shift as described above. The control system of FIG. 4 may be utilized to avoid operation of the replacement lamp in the event of a fan failure.

As seen in the embodiments of FIG. 4, the control system of FIG. 3 has been modified to provide a motion sensor 32 that detects whether the fan is moving. The motion sensor 32 may be responsive to providing power to the fan such that if no power is provided to the fan or if power is provided to the fan and motion is detected then power is provided to the replacement lamp. If power is provided to the fan and motion is not detected, then power to the replacement lamp is interrupted. This may result in the replacement lamp operating until the temperature in the recessed fixture exceeds the thermal switch threshold temperature and then turning off if the fan has failed. This intermittent operation of the lamp may alert the user to the failure. A failure indicator may also be provided on the accessory fan to confirm to the user that the failure is a result of the fan failure and not a failure of the replacement lamp. In such a way, the lifetime advantages of an LED replacement lamp may be realized without the limitation of a shorter fan lifetime.

According to some embodiments of the present invention, control circuitry can be used to operate the light source that is responsive to any operation of the cooling system or module that affects ambient temperature. In the control system embodiments of FIG. 4, any suitable technique for detecting operation of the fan may be substituted for the motion sensor 32. For example, power consumption may be monitored, motor current and/or voltage may be monitored, air motion may be detected or other techniques may be used for determining that the air moving component is operational. Likewise, any suitable motion sensing technique, such as optical or magnetic detection of the rotation of the fan assembly may be used. Thus, embodiments of the present inventive subject matter should not be construed as limited to a particular technique for determining that the air moving unit is operational, but may incorporate any technique, circuit or system suitable for determining the functionality of the air moving unit, such as a fan.

Embodiments of the present invention have been described above with respect to the cooling system or module being one or more fans. Embodiments of the present invention are not limited, however, to a particular type of device used to implement the cooling system or module as any suitable air movement device can be used including, but not limited to, various types of fans, such as an axial flow fan, mixed flow fan, cross flow fan, and/or centrifugal fan and/or a synthetic jet.

Figure 5:
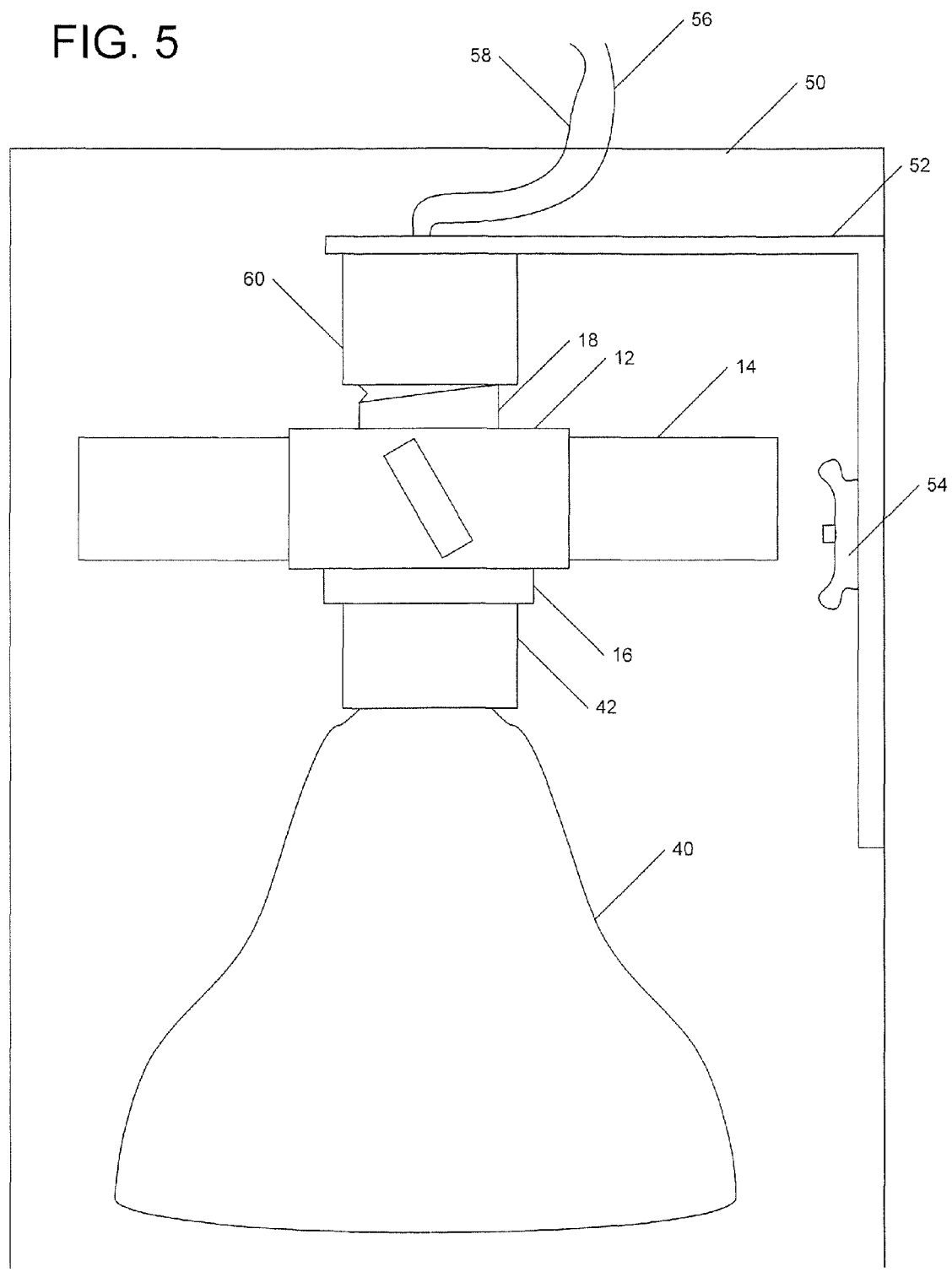
FIG. 5 is an illustration of installation of an accessory fan according to some embodiments of the present invention.

FIG. 5 illustrates a module replacement lamp system installed in a recessed light fixture 50, which provides a housing for the module replacement lamp system, in accordance with some embodiments of the present invention. The modular replacement lamp system includes a replacement lamp including a bulb area 40 and a connector 42. The replacement lamp is screwed in or otherwise mechanically and electrically connected to a cooling system or module, such as a fan assembly, by the first connector 16 such that the replacement lamp may be easily removed from the fan assembly for replacement. The replacement lamp may be, for example, a solid state lighting lamp suitable for use in open air environments, such as an open track head. For example, the replacement lamp may be a PAR 38 replacement lamp, such as the LRP-38 described in U.S. Provisional Patent Application Ser. No. 60/990,439, filed Nov. 27, 2007, entitled "High Efficiency Self Ballasted Lamp," and in the LED Lighting Fixtures press release dated Nov. 28, 2007 entitled "New Lamp from LED Lighting Fixtures Shatters World Record for Energy Efficiency," the disclosures of which are incorporated herein by reference as if set forth in their entirety. In accordance with various embodiments of the present invention, the solid state lighting lamp may comprise an LED, an Organic LED (OLED), and/or a Polymer LED (PLED).

The first connector 16 is connected to the second connector 18, the fan blades 14 and the fan motor 12 as described above. The fan assembly is screwed in or otherwise mechanically and electrically connected to the light socket 60 of the recessed light fixture 50 such that the fan assembly may be easily removed from the recessed light fixture 50 for replacement. Power is provided to the fan assembly by the power lines 56, 58 and from the fan assembly to the replacement lamp.

In some recessed fixtures, the height of the socket 60 may be adjusted by loosening a wing nut 54 or other retainer and sliding an "L" bracket 52 holding the socket 60 up and down in the fixture 50. Thus, the height of the fan assembly may allow for a reasonable range of adjustment of the replacement lamp in the fixture 50. In some embodiments, the fan assembly is as thin as possible so as to allow the maximum range of adjustment. While the fan is illustrated as being between the first and second connectors in the Figs., the fan and the connectors may also be offset such that the fan extends over the neck portion of the replacement lamp. Thus, the effective height of the fan assembly may be reduced.

With regard to the width/diameter of the fan assembly, this dimension may be sufficiently small to fit into the recessed fixture 50. The width of the fan assembly may less than the diameter of a PAR-38 lamp, less than the diameter of a PAR 30 lamp or even less than the diameter of an MR-16 lamp.

As seen in the embodiments of FIG. 5, together, the fan assembly and the replacement lamp provide an actively cooled lamp suitable for use in an enclosed fixture. While a recessed light fixture is illustrated in FIG. 5, other enclosed fixtures may also be utilized with the fan assembly and the replacement lamp. For example, the fan assembly and replacement lamp may be used in an enclosed track head, an enclosed surface mount fixture or an enclosed pendant fixture. Thus, embodiments of the present inventive subject matter should not be construed as limited to use in recessed fixtures but may be used in any enclosed fixture in which the fan assembly and replacement lamp fit. As used herein, an enclosed fixture is a fixture that has restricted air flow to the region where the lamp is installed.

Embodiments of the present invention have been described above with respect to the light source being a solid state lighting lamp. It will be understood that other types of lighting sources can be used in accordance with other embodiments of the present invention, including, but not limited to, fluorescent lamps, compact fluorescent lamps (CFLs), and/or incandescent bulbs. In some applications, it may even be desirable to use a cooling system or module, according to some embodiments of the present invention, with an incandescent bulb in an open air or enclosed configuration to spread the heat generated by the incandescent bulb into the surrounding area to assist in heating a room.

Figure 6:
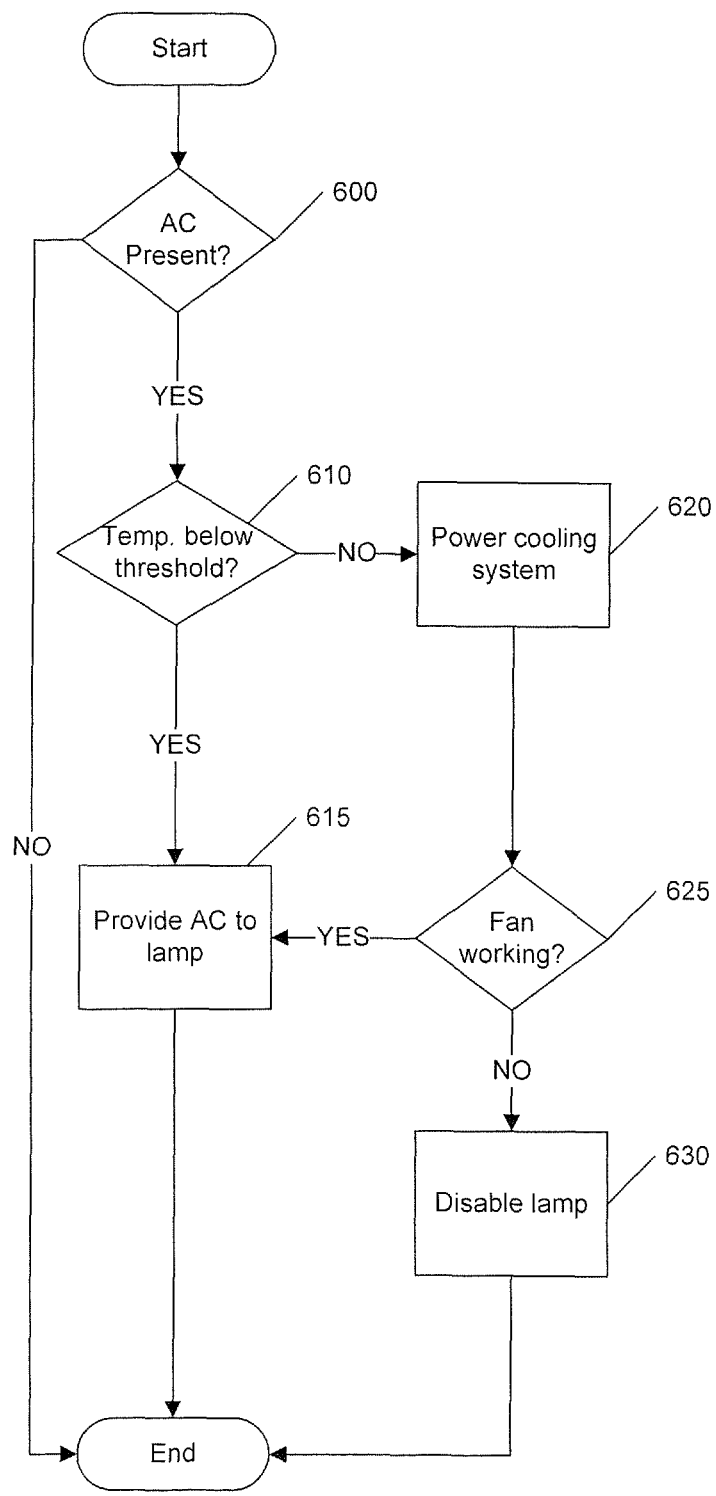
FIG. 6 is a flowchart illustrating operation of an accessory cooling system according to some embodiments of the present invention.

FIG. 6 illustrates operations of a cooling system or module, such as a fan assembly, and lamp as illustrated in FIG. 5 according to some embodiments of the present invention. As seen in FIG. 6, if no AC power is present (block 600), then the lamp is off. If AC power is present and the temperature is less than a threshold value (block 610), then the cooling system or module is turned off and power is provided to the lamp (block 615). If the temperature is not below the threshold, then the cooling system is powered on (block 620). If the cooling system fan is working (block 625), then the lamp is powered on. If the cooling system power is not working (block 625), then the lamp is disabled (block 630).

Figure 7A:
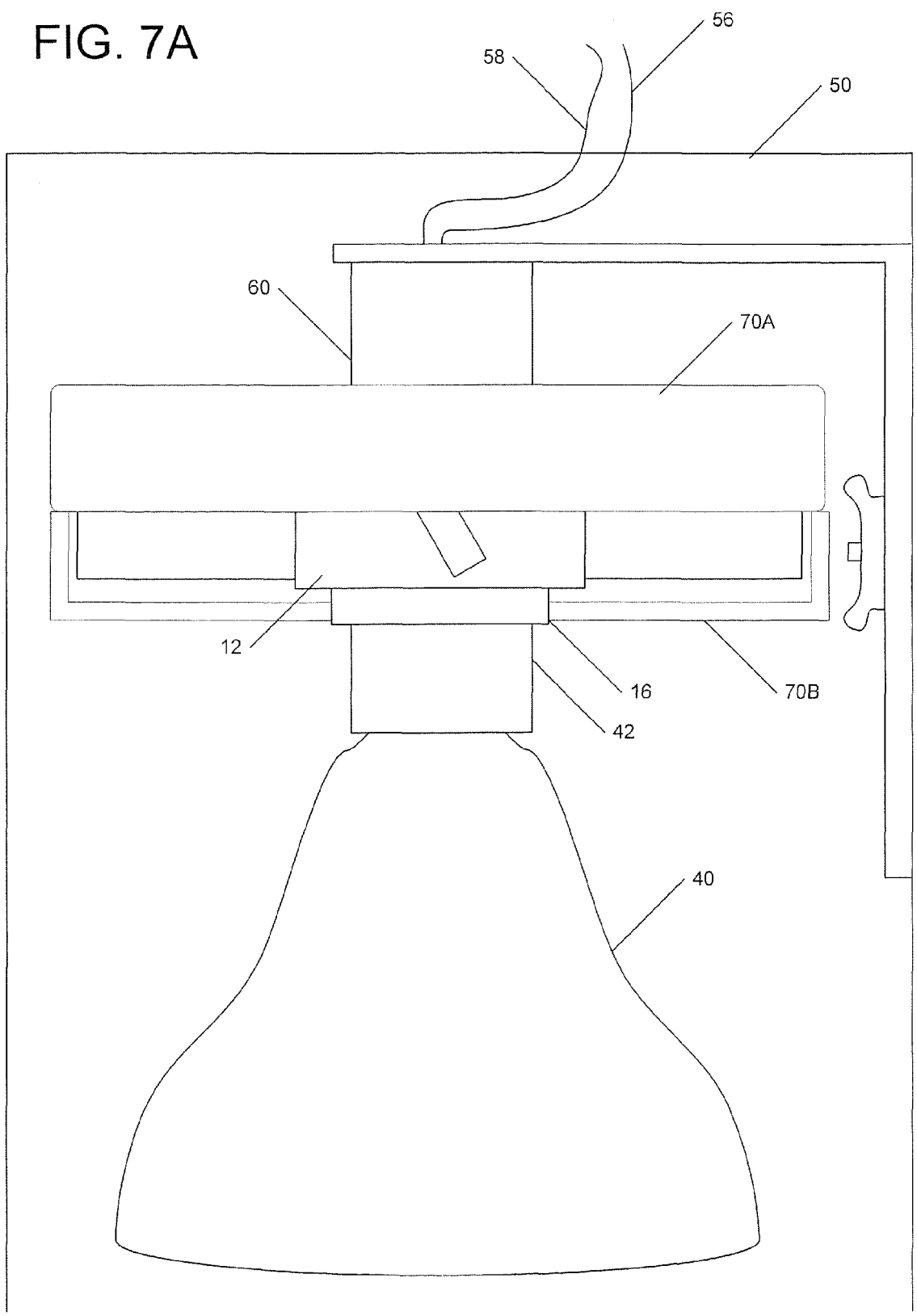
FIG. 7A is an illustration of an installation of an accessory fan having an air direction component according to some embodiments of the present invention.
Figure 7B:
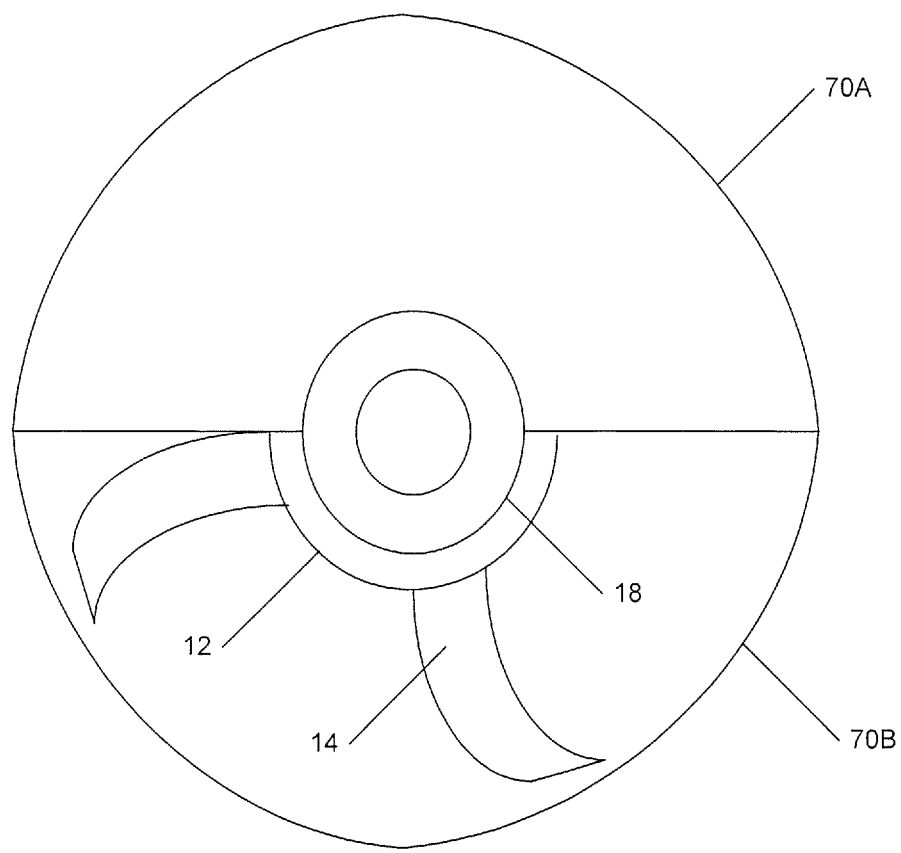
FIG. 7B is cross-sectional illustration of an accessory fan according to FIG. 7A.

FIGS. 7A and 7B illustrate further embodiments of the present inventive subject matter where air flow is directed by an air direction component 70A and 70B. The air direction component 70A and 70B directs the flow of air to pull air from one side of the housing 50 and, in some embodiments, from outside the housing 50, and push air into the other side of the housing 50 and, in some embodiments, to push air out the other side of the fixture. Thus, the upper portion 70A of the air direction component illustrated in FIGS. 7A and 7B may act as a shroud that prevents air flow into the fan from one side of the housing 50 and the lower portion 70B of the air direction component may act as a shroud the prevent air flow out of the fan on an opposite side of the housing 50. In addition to breaking the boundary layer and, thereby, improving the heat transfer from the replacement lamp to the surrounding environment, such an air direction component 70A and 70B may allow for exchange of air from within the housing 50 to an outside environment with a lower ambient temperature. This exchange of air may both cool the replacement lamp and provide heated air to the outside environment.

It will be understood that the air direction component 70A and 70B shown in FIGS. 7A and 7B is for purposes of illustration only. Other configurations of shrouds or ducting can be utilized to provide controlled air movement within the housing and with the external environment. Such controlled air movement may also extend the life of the fan as it may reduce the load on the fan by allowing a less restricted path for air flow.

Additionally or alternatively, the configuration of the fan itself may provide for pulling air from one portion of the housing and pushing air into another portion of the housing. For example, a squirrel cage fan can pull air from a central axis of rotation and push air out along an axis that is 90° to the axis of rotation. Thus, air could be pulled from the center of the housing 50 and pushed out toward the outer sides of the housing 50. A shroud could also be provided to help direct the air downward and out of the housing along the outer sides while air is pulled in from the central region of the housing.

Other types of techniques can be used to direct the movement of air in cooperation with a cooling system or module including, but not limited to, modifications to the mechanical structure of the cooling system or module and/or other physical structures associated with the lighting application. Such modifications may improve the cooling efficiency of the cooling system or module.

While embodiments of the present inventive subject matter have been described with reference to a single air motion device, different numbers of devices could be provided. For example, four fans, one in each quadrant, could be arranged around a central region where the connectors are provided.

Furthermore, while embodiments of the present invention have been described with reference to fixtures with substantially circular openings, embodiments of the present invention could also be utilized with replacements for linear fluorescent lamps where the fan assembly was interposed at one or both ends of the fluorescent lamp. As used herein, references to a fluorescent lamp refer to linear fluorescent lamps, compact fluorescent lamps, or other types of fluorescent lamps.

Embodiments of the present invention may allow lighting sources, such as solid state lamps, to be used in higher temperature environments that they were not originally designed to be used for. Moreover, cooling systems or modules according to some embodiments of the present invention may be added to conventional lighting applications without the need for modifications to the electrical connections for the lamp or power source. The modularity of the cooling systems or modules according to some embodiments of the present invention may allow thermal management to be easily added to and removed from lighting applications as desired.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. An apparatus, comprising:
   a lighting assembly comprising a light source; and
   a cooling module that is removably coupled to the lighting assembly and configured to selectively provide power to the light source and to cool the light source, the cooling module comprising a cooling device configured to cool the light source and control circuitry configured to detect a temperature of the lighting assembly, to operate the cooling device responsive to the detected temperature, to detect a failure of the cooling device based on an indicator of functionality of the cooling device other than temperature and to prevent energization of the light source responsive to the detected failure.

2. The apparatus of claim 1, wherein the lighting assembly comprises an electrical power access port and wherein the light source is coupled to the access port.

3. The apparatus of claim 2, wherein the light source is coupled to the electrical power access port via the cooling module.

4. The apparatus of claim 1, wherein the cooling module comprises a fan having an axis of rotation that is substantially coaxial with an axis defined by the electrical power access port and an electrical power connector of the light source.

5. The apparatus of claim 1, wherein the cooling module is a fan having an axis of rotation that is substantially perpendicular to an axis defined by the electrical power access port and an electrical power connector of the light source.

6. The apparatus of claim 2, wherein the electrical power access port comprises an Edison or GU24 port that is configured to receive the cooling module; and
   wherein the cooling module comprises an Edison or GU24 port that is configured to receive the light source.

7. The apparatus of claim 1, wherein the control circuitry is configured to operate the cooling module responsive to an operation of the light source that affects ambient temperature.

8. The apparatus of claim 7, wherein the control circuitry is further configured to operate the cooling module responsive to power consumption of the light source and/or intensity of light provided by the light source.

9. The apparatus of claim 7, wherein the control circuitry is configured to enable operation of the cooling module when the ambient temperature exceeds a threshold temperature.

10. The apparatus of claim 9, wherein the threshold temperature is a first threshold temperature; and
    wherein the control circuitry is further configured to disable operation of the cooling module when the ambient temperature falls below a second threshold temperature that is lower than the first threshold temperature.

11. The apparatus of claim 7, wherein the control circuitry is configured to periodically enable operation of the cooling module when the ambient temperature exceeds a threshold temperature.

12. The apparatus of claim 1, wherein the control circuitry is configured to operate the light source responsive to power consumption of the cooling module, air movement proximate to the lighting assembly, and/or movement of a part associated with the cooling module.

13. The apparatus of claim 1, wherein the light source comprises a solid state light source.

14. The apparatus of claim 13, wherein the solid state light source comprises a Light Emitting Diode (LED), an Organic LED (OLED), and/or a Polymer LED (PLED).

15. The apparatus of claim 1, wherein the light source comprises a fluorescent lamp.

16. The apparatus of claim 1, wherein the light source comprises an incandescent lamp.

17. The apparatus of claim 1, wherein the cooling module comprises an air movement device.

18. The apparatus of claim 17, wherein the cooling module comprises a plurality of air movement devices.

19. The apparatus of claim 17, wherein the air movement device comprises a fan.

20. The apparatus of claim 19, wherein the air movement device comprises a synthetic jet.

21. The apparatus of claim 1, further comprising:
    a housing having an open end;
    wherein the light source and cooling module are positioned in the housing so as to be recessed from the open end; and
    wherein the light source is operable to project light through the open end of the housing.

22. The apparatus of claim 21, further comprising:
    an air direction component configured to direct a flow of air into and out of the cooling module.

23. An apparatus, comprising:
    a thermal management device, the thermal management device comprising:
    a first electrical connector configured to connect to an electrical connector of a light fixture; and
    a second electrical connector configured to connect to a light source;
    an air movement device configured to move air proximate the light source so as to break a boundary layer between the light source and the surrounding environment; and
    a control circuit configured to detect a temperature of the apparatus, to operate the air movement device responsive to the detected temperature, to monitor an operational status of the air movement device based on an indicator of functionality of the air movement device other than temperature and to selectively provide power from the light fixture to the light source responsive to the monitored operational status of the air movement device.

24. The apparatus of claim 23, wherein the air movement device comprises a fan.

25. The apparatus of claim 24, wherein the fan is an axial flow fan, a mixed flow fan, a cross flow fan, or a centrifugal fan.

26. The apparatus of claim 23, wherein the air movement device comprises a synthetic jet.

27. The apparatus of claim 23, where the control circuitry prevents power from being provided to the light source if the air movement device has failed.

28. The apparatus of claim 23, wherein the control circuitry is configured to operate the air movement device if the temperature exceeds a first threshold temperature and prevent operation of the air movement device if the temperature is below a second threshold temperature.

29. The apparatus of claim 28, wherein the first threshold temperature is higher than the second threshold temperature.

30. The apparatus of claim 23, wherein a diameter of the apparatus is not greater than a maximum diameter of a BR40 lamp.

31. The apparatus of claim 23, wherein a diameter of the apparatus is not greater than a maximum diameter of a PAR30 lamp.

32. The apparatus of claim 23, wherein the first electrical connector comprises an Edison or GU24 interface and the second electrical connector comprises an Edison or GU24 interface.

33. A cooling module for a recessed lighting fixture that comprises a housing that defines an interior airspace and having an opening therein configured to provide fluid communication between the interior airspace and an exterior airspace, the recessed light fixture further including a first lamp socket positioned within the housing, the cooling module comprising:

a lamp connector configured to be removable mechanically and electrically connected to the first lamp socket such that, when the lamp connector is connected to the first lamp socket, the cooling module is positioned within the airspace:

a fan configured to generate an airflow;

a second lamp socket; and a control circuit configured to provide power to the fan and to the second lamp socket from the first lamp socket, wherein, a lamp is electrically and mechanically connected to the second lamp socket, wherein the control circuit is configured to detect a temperature of the interior airspace, to operate the fan responsive to the detected temperature, to detect an operational status of the fan based on an indicator other than temperature and to selectively provide power to the lamp responsive to the detected operational status.

34. The cooling module of claim 33, wherein the control circuit is configured to prevent energization of the lamp responsive to a failure of the fan based on the indicator other than the detected temperature.

35. A modular lamp replacement system comprising the cooling module of claim 33 and an LED lamp configured to be electrically and mechanically connected to the second lamp socket such that the LED lamp is positioned within the interior airspace between the opening and the cooling module and a boundary layer between the LED lamp and the interior airspace is broken by the directed airflow.

* * * * *

UNITED STATES PATENT AND TRADEMARK OFFICE
CERTIFICATE OF CORRECTION

PATENT NO. : 8,500,305 B2  
APPLICATION NO. : 12/245458  
DATED : August 6, 2013  
INVENTOR(S) : O'Sullivan et al.

Page 1 of 1

It is certified that error appears in the above-identified patent and that said Letters Patent is hereby corrected as shown below:

In the Claims:
Column 12, Claim 20, Line 30:

Please correct "The apparatus of claim 19, wherein"
to read -- The apparatus of claim 17, wherein --

Signed and Sealed this
Twentieth Day of May, 2014

Michelle K. Lee
*Deputy Director of the United States Patent and Trademark Office*